US009094582B2

(12) United States Patent
Lewin

(10) Patent No.: US 9,094,582 B2
(45) Date of Patent: *Jul. 28, 2015

(54) APPARATUS AND METHOD FOR COMMUNICATING WITH A MIRROR CAMERA

(75) Inventor: Asaf Lewin, Nordiya (IL)

(73) Assignee: PICK'NTELL LTD., Tel Aviv (IL)

( * ) Notice: Subject to any disclaimer, the term of this patent is extended or adjusted under 35 U.S.C. 154(b) by 411 days.

This patent is subject to a terminal disclaimer.

(21) Appl. No.: 13/168,977

(22) Filed: Jun. 26, 2011

(65) Prior Publication Data

US 2012/0166410 A1    Jun. 28, 2012

Related U.S. Application Data

(60) Provisional application No. 61/426,290, filed on Dec. 22, 2010.

(51) Int. Cl.
| | | |
|---|---|---|
| *G06Q 30/00* | (2012.01) | |
| *H04N 7/18* | (2006.01) | |
| *G06Q 30/02* | (2012.01) | |

(52) U.S. Cl.
CPC ........... *H04N 7/183* (2013.01); *G06Q 30/0251* (2013.01)

(58) Field of Classification Search
CPC ............................ H04N 7/183; G06Q 30/0251
USPC ............... 705/26.1, 26.2, 26.25, 26.3, 26.35, 705/26.4, 26.41–26.44, 26.5, 26.61–26.64, 705/26.7, 26.8, 26.81, 26.82, 26.9, 27.1, 705/27.2
See application file for complete search history.

(56) References Cited

U.S. PATENT DOCUMENTS

| | | | | |
|---|---|---|---|---|
| 4,268,121 | A | * | 5/1981 | Peskin ........................ 359/856 |
| 6,525,663 | B2 | * | 2/2003 | Colmenarez et al. ...... 340/573.1 |
| 6,886,056 | B2 | | 4/2005 | Ohmura |
| 7,239,343 | B2 | * | 7/2007 | Ohsawa et al. ............ 348/211.3 |
| 7,424,447 | B2 | | 9/2008 | Fuzell-Casey |
| 7,948,481 | B2 | | 5/2011 | Vilcovsky |
| 8,624,883 | B2 | | 1/2014 | Vilcovsky |
| 2002/0078157 | A1 | * | 6/2002 | Matsumoto ................... 709/206 |

(Continued)

FOREIGN PATENT DOCUMENTS

| | | | | |
|---|---|---|---|---|
| DE | WO 00/22955 | * | 4/2000 | ............. A45D 44/00 |
| EP | 1351172 | | 10/2003 | |
| EP | 1372092 | | 12/2003 | |
| JP | 2005-286687 | * | 10/2005 | ............. H04N 5/225 |
| WO | 2008/0127194 | | 10/2008 | |

OTHER PUBLICATIONS

Wei Zhang et al. "An Intelligent Fitting Room Using Multi-Camera Perception", IUT08, Jan. 13-16, 2008, Maspalomas, Gran Canaria, Spain. Copyright 2008 ACM 978-1-59593-987-6/ 08, pp. 60-69.
Sven Molkenstruck et al. "3D Body Scanning in a Mirror Cabinet", DAGM 2008, LNCS 5096, pp. 284-293, 2008. © Springer-Verlag Berlin Heidelberg 2008.

*Primary Examiner* — Naeem Haq
(74) *Attorney, Agent, or Firm* — Soroker Agmon

(57) ABSTRACT

The subject matter discloses a system for communicating between a customer at a retail store and a mirror point used to generate media files at the retail store using a capture device, the system comprises a storage for storing contact information of the customer; a processor for enabling access of a customer's device to the mirror point; a communication module for transmitting the media files generated by the mirror point at the retail store to the customer's desired destination using the contact information stored at the storage structure.

21 Claims, 3 Drawing Sheets

(56) References Cited

U.S. PATENT DOCUMENTS

| | | |
|---|---|---|
| 2002/0188378 A1 | 12/2002 | Sufer |
| 2005/0085263 A1 | 4/2005 | Kim et al. |
| 2008/0198271 A1 | 8/2008 | Malki |
| 2008/0251575 A1* | 10/2008 | Bowling et al. ............... 235/375 |
| 2010/0111426 A1 | 5/2010 | Chu |
| 2011/0063466 A1* | 3/2011 | Imata et al. ................ 348/222.1 |
| 2012/0320197 A1* | 12/2012 | Werts ............................ 348/143 |
| 2013/0229482 A1 | 9/2013 | Vilcovsky |

* cited by examiner

APPARATUS AND METHOD FOR COMMUNICATING WITH A MIRROR CAMERA

FIELD OF THE INVENTION

The subject matter relates generally to retail clothing and more specifically to a method for taking pictures in a retail store using a mirror camera.

BACKGROUND OF THE INVENTION

When a customer in a retail store examines a product, he/she may observe the product from 360 degrees. However, when trying on a garment or a shoe, observation is limited as some of the garment or shoe requires effort from the customer. As a result, many customers prefer viewing themselves wearing the garment in front of a mirror.

When trying on a garment or shoe in front of a mirror, it is difficult for the customer to remember and compare the images seen in the mirror of all articles tried on. Hence, many retail stores provide a kiosk in which photos of a user trying on a garment or shoe are displayed, such that the user can review the images on a display in the kiosk. The user can also use the kiosk to manipulate the photos, store them, send them, upload them to a social network or another web page, receive feedbacks and decide whether he/she wishes to purchase the garment or shoe.

SUMMARY

It is an object of the subject matter to disclose a method, comprising: receiving information related to a customer communicating with a mirror point positioned at a retail store, the customer operating the mirror point, said mirror point comprising a mirror camera; wherein the information related to the customer is received from two or more mirror points and storing the information related to the customer received from the two or more mirror points and enabling the customer to access the information related to the customer received from the two or more mirror points.

In some embodiments, the method further comprises a step of receiving commands from the customer's device when operating the mirror camera in the mirror point. In some embodiments, the method further comprises a step of manipulating the mirror camera according to the commands received from the customer's device.

In some embodiments, the information related to the customer is a media file generated at the mirror point. In some embodiments, the method further comprises a step of removing the media file from a display of the mirror point immediately after the media file is transmitted to the desired destination.

In some embodiments, the method further comprises a step of displaying whether the mirror point is occupied by a customer or is vacant. In some embodiments, the method further In some embodiments, displaying that the kiosk point is vacant is performed after transmitting the media file to the desired destination.

In some embodiments, the method is performed while the customer tries on an article at the retails store when the media file is generated.

Is it another object of the subject matter to disclose a system communicating with two or more mirror points at retail stores, the mirror points are operable by a customer, the system comprises:

a storage structure for storing information related to the customer;

a processor for remotely controlling the two or more mirror points and; the processor is further configured to enable the customer to access said information related to the customer comprises a media files generated at the two or more mirror points; a communication module for transmitting the information related to the customer to the customer's desired destination using contact information stored at the storage structure.

In some embodiments, the storage structure further stores media files generated by the mirror point.

In some embodiments, the customer's desired destination is the customer's device. In some embodiments, the customer's desired destination is a customer's email account, or social network account.

In some embodiments, the system further comprises a business interface for generating reports comprising data associated with the mirror point and user's operation of the mirror point. In some embodiments, the communication module further transmits commercial data to an entity associated with the retail stores according to the reports generated by the business interface.

BRIEF DESCRIPTION OF THE DRAWINGS

Exemplary non-limited embodiments of the disclosed subject matter will be described, with reference to the following description of the embodiments, in conjunction with the figures. The figures are generally not shown to scale and any sizes are only meant to be exemplary and not necessarily limiting. Corresponding or like elements are optionally designated by the same numerals or letters.

DETAILED DESCRIPTION

One technical challenge disclosed in the subject matter is to reduce the time consumed by a single user using a kiosk point in a store. When the kiosk point provides the user not only with taking a photo but also with additional options such as sending the photos, receiving feedback, saving the photos and the like, fewer users can use the kiosk point at a period of time. Another technical challenge is to allow the user of kiosk point to have privacy regarding the pictures taken at the kiosk point. Such privacy is lacking when other users or customers in the store can view photos displayed on the mirror of the kiosk point. The same privacy is also lacking as to customer's contact to which the photos or other content may be sent from the kiosk point.

One technical solution of the disclosed subject matter is a method for enabling a customer to manipulate media files generates by a mirror kiosk at a customer's device instead of the mirror kiosk itself. The method and system of the subject matter also provide managing all the data related to a single customer at a central system, even as the data is received from multiple mirror points. Data related to the client is stored and managed at a system remotely connected to the mirror points. The method comprises establishing a communication channel between the kiosk point and the system. The communication channel provides that the media files generated by the kiosk mirror is sent to the system, and from the system the media files are transmitted to the customer's device. Hence, when performing actions in the store, such as sending media files, receiving feedbacks, discussing the garment or the like, other users can use the kiosk point after the media files are transmitted from the kiosk point to the system of the subject matter. Further, the customer is not required to stay in the same store while performing the actions disclosed above, as the media files can be stored at the customer's device. The communication channel also enables further connection between the retail store and the user's device, especially a mobile phone, as the system of the disclosed subject matter may store the phone number or other information identifying the user for further use, such as sending commercials, identifying when the user is in the store and the like.

Figure 1:
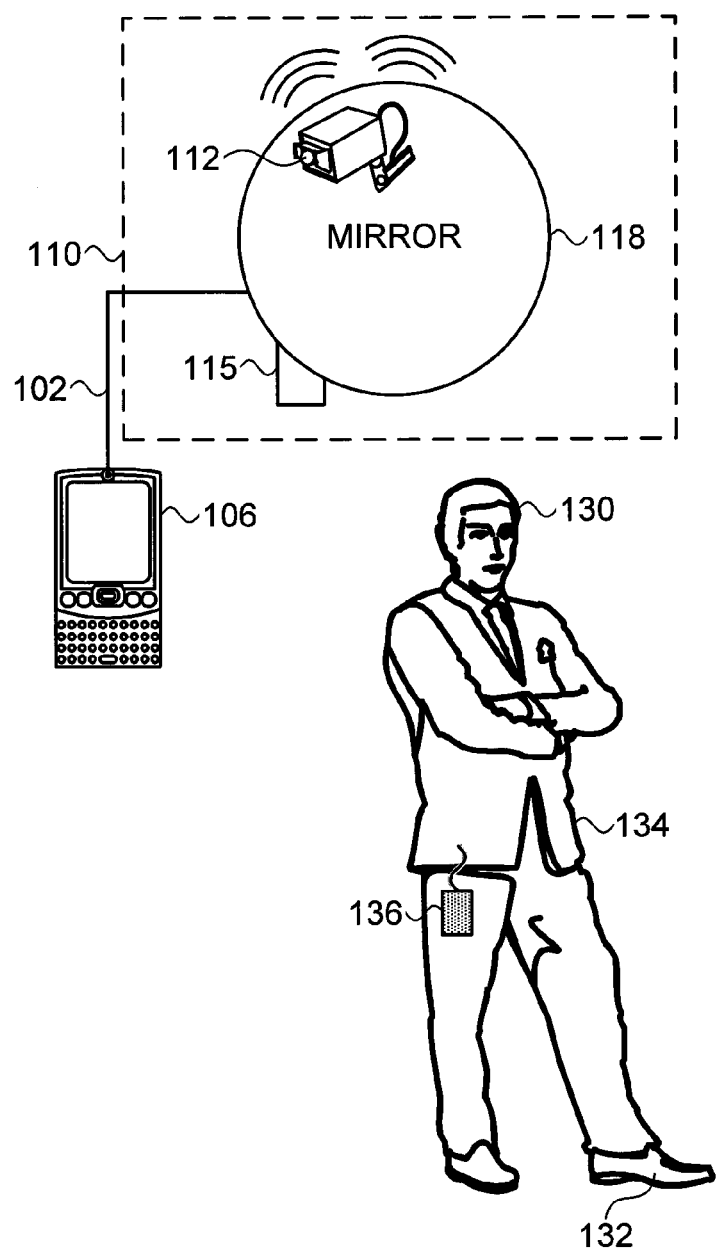
FIG. 1 shows a computerized environment associated with a clothing store, according to some exemplary embodiments of the subject matter.

FIG. 1 shows a computerized environment associated with a clothing store, according to some exemplary embodiments of the subject matter. The computerized environment comprises a mirror point 110 within a retail store, for example a clothing store. The retail store may be any business or store in which a customer 130 examines or tries on garments, clothes, shoes, accessories, hats or other wearable objects. The mirror point 110 comprises a capture device 112. The capture device 112 may be a camera, a video camera and the like. The mirror point 110 may also comprise a display device 118. The display device 118 may be embedded in the mirror of the mirror point 110 and display the customer as reflected by the mirror before the media file, such as the image or video, is generated. The display device 118 may display the image or video captured by the capture device 112. The customer 130 communicates with the mirror point 110 using a customer's device 106. The customer's device 106 may be a mobile phone, a tablet computer, a Personal Digital Assistance (PDA), a laptop computer and the like. The customer's device may also be a web page or web application accessible to the customer, from which the customer can view media files and send commands that can be interpreted for manipulating the capture device 112.

The mirror point 110 may have a control unit 115 for controlling the capture device 112. The control unit 115 may receive commands from the customer's device 106 wirelessly or via a wired cable 102. The control unit 115 may process the received commands and operate the capture device 112 accordingly. The commands may be rotating the capture device 112, zoom-in, zoom-out, take a picture, or video shot and the like.

When the customer 130 examines an article in a clothing business, such as a shirt 134 or a shoe 132, the customer 130 communicates with the capture device 112 of the mirror point 110 using the customer's device 106. The customer commands the capture device 112 to begin taking a still photo or a video shot. When the media desired by the customer 130 is a video shot, in some embodiments the customer 130 also commands termination of the shot, while in other embodiments the video shot is terminated automatically after a predefined period. After the media file is generated, the capture device 112 transmits the media file to the customer's device 106 or to the system of the subject matter. The media file may be transmitted using an email message, an SMS or MMS message, to the customer's social network account, to a customer's online image organizer account such as Picasa, sent via a mobile application and the like. After transmitting the image or video, the mirror point may be available to other customers or suggest the customer 130 to take another image or video. In some exemplary cases, the mirror point may define the number of media files for each customer according to a number of customers waiting to use the capture device 112, the time in the day, the identity of the customer and the like. After receiving the media file from the mirror point, the customer can store the media file, upload it, receive comments and the like, all using customer's device 106 and not the mirror point 110. Using the customer's device 106 frees the mirror point 110 to other customers and significantly increase the numbers of customers that can use a mirror point on a given time period.

Figure 2:
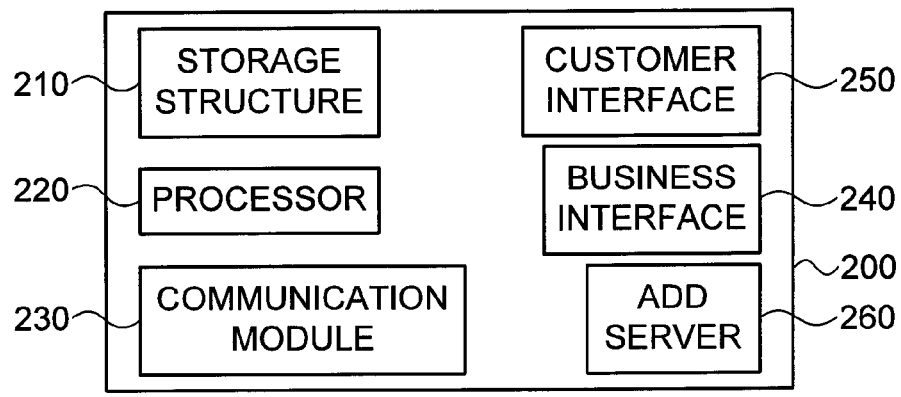
FIG. 2 shows a computerized system for handling media and data associated with a mirror point at a clothing store, according to some exemplary embodiments of the subject matter.

FIG. 2 shows a computerized system for handling media and data associated with a mirror point at a retail store, according to some exemplary embodiments of the subject matter. In some exemplary cases, the system 200 communicates with multiple retail stores of the same network. In some other cases, the system 200 communicates with retails stores of different networks, for example retail stores of Nike as well as retail stores of Gap. The system enables storing data related to the customer that was generated at different retail stores, for example at different mirror points of different retails stores or different mirror points of the same retail store. The customer can enter the system 200 and review media file and other information that was collected from multiple retail stores, compare images taken from different retail stores and the like.

The system 200 for handling media and data associated with a mirror point 110 comprises a storage structure 210. The storage structure 210 is described in details in FIG. 3 and stores various types of information, such as, for example, information related to customers, media files taken at the mirror point 110, transactions, stores, communication preferences of customers and the like. After the capture device 112 of the mirror point 110 takes an image or video, the image or video may be stored at the storage structure 210 or sent directly from the capture device 112 to the customer's device 106 or to another account desired by the customer 130. The storage structure 210 stores business information that is useful and unique to businesses, such as contact details of the customer and customer activities in stores having mirror points. Sending the image or video to the customer's device or to another account selected by the customer provides the business the ability to send commercial data to the customer such as promotion, coupons, reminder that the customer is located in proximity to the business and the like.

The system 200 further comprises a processor 220. The processor manages the data flow at the system 200. The processor 220 receives information from the mirror point 110 for determining when the mirror point 110 is busy or available. The processor 220 may also verify authentication of customers to the system 200. The customers input access data into a customer interface 250. Such access data may be inputted via a website via SMS, email, MMS or a mobile application. The access data is transmitted to the processor 220 that enables the customer to access the mirror point. The processor 220 may identify customers entering the clothing store. Such identification may be performed using a mobile application on the customer's device 106. The mobile application obtains the location of the customer's device 106, for example from a GPS signal at the customer's device 106 and correlates the location with locations of clothing stores that are stored at the mobile application client, or through other operations performed by the customer using the mobile application of current invention such as picture or video taking, bar-code scanning, coupon redemption, etc.

Once the customer uses the mirror point, the media files, such as image or video, and other data related to the customer are stored at the storage structure 210. The processor 220 enables analysis of the data stored at the storage structure. Such analysis may be automatic or performed according to queries from personnel. Such analysis may be performed using a predefined set of rules. Such analysis may be used to determine future communication to the customer's device 106. Such future communication may include sending coupons and promotions to the customer's device 106 based on previous events stored at the storage structure 210 ad analyzed by the processor 220.

The processor 220 may also manage customer profiles and media files of the system 200. The processor 220 may also determine data presented to the customer when accessing the mobile application.

The system 200 further comprises a communication module 230. The communication module transmits data to the customer's desired destination. The desired destination may be the customer's device 106 using an MMS or SMS message, a mobile application, the customer's email account, the customer's online image organizer such as Picasa, the customer's or another person's social network account and the like.

The communication module 230 may include an email server, an SMS server, an MMS server, an instant messaging server and the like. The communication module 230 of the disclosed subject matter requires the customer to leave contact details to receive the image or video file taken at the mirror point 110. Prior art kiosk points enable users to access their email accounts or social network from the kiosk itself, and the customer's contact details are not shared between kiosk points. The communication module 230 may send the image or video or store the image or video on an online server and send the link to the image or video to the customer's desired destination.

The system 200 further comprises a business interface 240. The business interface provides connection between a business associated with a mirror point, such as a clothing store or a business associate of the clothing store and the data obtained at the system 200. Such data may be stored at the storage structure 210 or analyzed using the processor 220. The business interface may generate reports to the business associated with a mirror point according to a predefined set of rules, upon request, on a periodic manner and the like. The reports may include association of customer's transactions associated with previous use of the mirror point 110. The reports may include data related to the use of mirror points in different stores by different customers. The reports may also include transactions that are not related, to mirror point's usage, such as barcode scanning, coupon redemptions and the like. The reports generated by the business interface 240 may later be used by an ad server 260 of the system 200. The ad server 260 sends context specific and targeted ads, coupons and other promotion data to the customers and customer's friends. The ad server 260 sends the ads via social networks, emails and MMS messages, via the mobile application of the current invention, based on their current location, and previous usage history of the system 200. Transmission of image or video taken at the mirror point 110, as disclosed in the subject matter, provides the ad server to keep communicating with the customer after taking the image or video at the mirror point.

The system 200 further comprises a customer interface 250. The customer interface 250 communicates with the customer's device 106 and with the mirror point 110. The customer interface receives commands from the customer via the customer's device or via an online or mobile application. Such command may relate to taking a video or photo using the capture device 112 at the mirror point 110. Such commands may relate to the length of the video, number of photos, quality of video or photo, zoom and the like. The customer interface transmits the commands from the customer to the mirror point such that the customer has remote control of the capture device 112 at the mirror point 110. Such remote control is enabled by establishing a communication channel between the mirror point 110 and the customer's device 106. The communication channel is established when the customer sign up to the system 200. The contact details of the customer are stored at the storage structure 210 and can be used by the customer interface to enable remote control from the customer's device 106. The customer inputs data related to the customer's device 106 or other information that may be presented on the display device 118 at the system 200, the inputted data is later used to identify the customer's device when controlling the mirror point of the clothing store.

Figure 3:
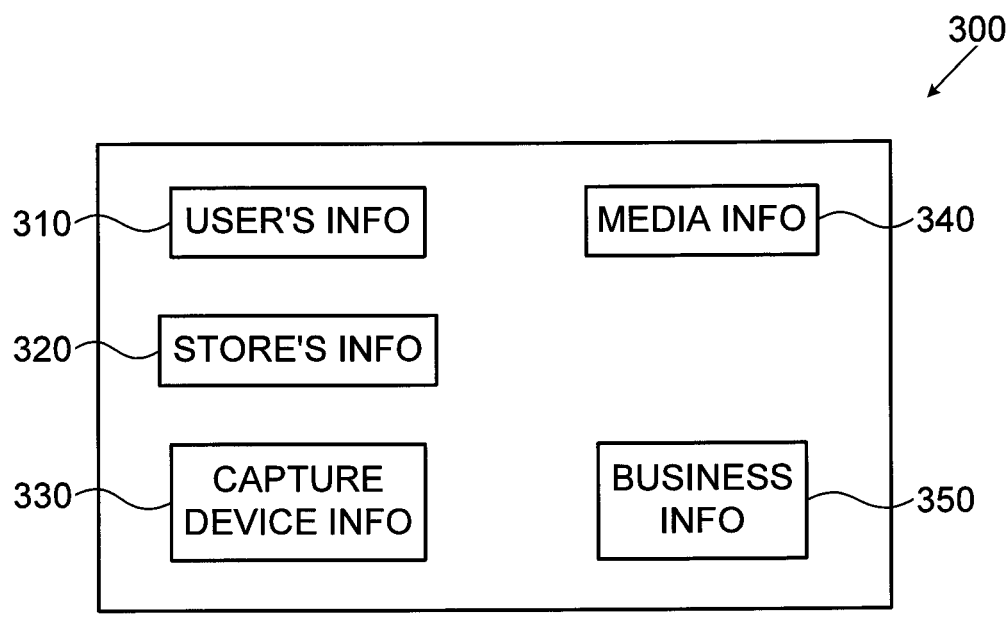
FIG. 3 shows a storage structure of the computerized system associated with a mirror point at a clothing store, according to some exemplary embodiments of the subject matter.

FIG. 3 shows a storage structure of the computerized system associated with a mirror point at a clothing store, according to some exemplary embodiments of the subject matter. As the system 200 receives information from two or more mirror points, the storage structure 300 also stores information associated with two or more mirror point located at retail stores or with mirror points or several stores. The storage structure 300 comprises a user's information storage 310 comprising information related to users of the mirror points in stores communicating with the computerized system 200. The information related to user's of the system 200 is received from the two or more mirror points and enable a user of the system to review information gathered from, multiple mirror points, for example media files generated at different retail stores. The user can then compare media files in which the user tries different articles of different retail stores. The user's information storage 310 may comprise user's identifier, user's name, address, communication details such as phone number, social network account, email account, customer's device type such as iPhone, BlackBerry and the like, preferred channel for receiving images such as MMS, WAP links embedded in SMS messages, WAP push, email or via a mobile application, language, password and the like.

The storage structure 300 further comprises a stores information storage 320 comprising stores information related to stores such as store identifiers, store names, stores addresses, website, business category, phone number, email address and the like. The stores information is received from two or more mirror points associated with the system 200. The stores information enables the system 200 to automatically or manually generate reports that include information received from, for example, all retail stores of a single brand, such as all GAP stores in the USA.

The storage structure 300 may also comprise a capture device information storage 330 related to capture devices. Such information may be capture device's Identifier, a stores associated with a capture device, a capture device's type, a capture device record creation date, a display device or printer associated with the capture device and the like. The storage structure 300 may further comprise a media information storage 340 related to the media file sent to the customer's device, the media file type, size, garment associated to the media file, garment price and the like.

The storage structure 300 may also comprise a business information storage 350 related to business information obtained at the mirror points associated with the retail stores. The business information storage 350 may include data related to the garment or shoe associated with the photo, for example the ID or code of the garment or shoe. Such ID or code may be displayed on a tag such as tag 136 associated with the shirt 134 of FIG. 1. The business information storage 350 may include prices, coupons or promotions suggested to or otherwise associated with the customer, previous transactions of the customer, previous visits of the customer at stores associated with the system 200, previous articles the customer tried, customer's size and the like.

Figure 4:
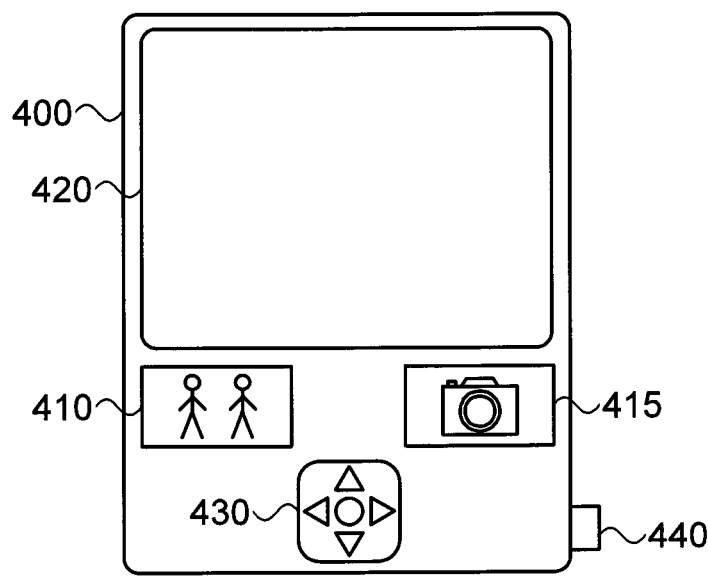
FIG. 4 shows a customer's device communicating with a mirror point at a clothing store, according to some exemplary embodiments of the subject matter; and, FIG. 5 shows a method of communicating with a mirror point at a clothing store, according to some exemplary embodiments of the subject matter.

FIG. 4 shows a customer's device communicating with a mirror point at a retail store, according to some exemplary embodiments of the subject matter. The customer's device 400 may communicate with the mirror point 110 wirelessly or using a cable. The customer's device may have a communication interface 440 in case the communication with the mirror point 110 is wired. The communication interface 440 may be a USB interface or another interface desired by a person skilled in the art. The customer's device 400 may comprise a display element 420 used for displaying media files generated at the mirror point 110 and received to the customer's device 400, or display other information such as coupons and promotions, store details, garment article details and the like.

The customer's device 400 may comprise a social network interface 410 enabling the customer to upload the media files received from the mirror point to a social network or another online page or application. The social network icon 410 may be a button or cursed at in case of a touch screen. The customer's device 400 may comprise a capture device control 430 enabling the customer to control the capture device at the mirror point. The communication channel provides the customer the ability to push a button at the capture device control 430, have the command sent to the capture device at the mirror point 110 via the system 200, for example using the customer interface 250. The capture device control 430 may comprise different buttons or icons for different commands, such as zoom, rotate, tilt and the like. The customer's device 400 may comprise a capture device interface 415 enabling the customer to begin and finish generation of media files at the mirror point.

Figure 5:
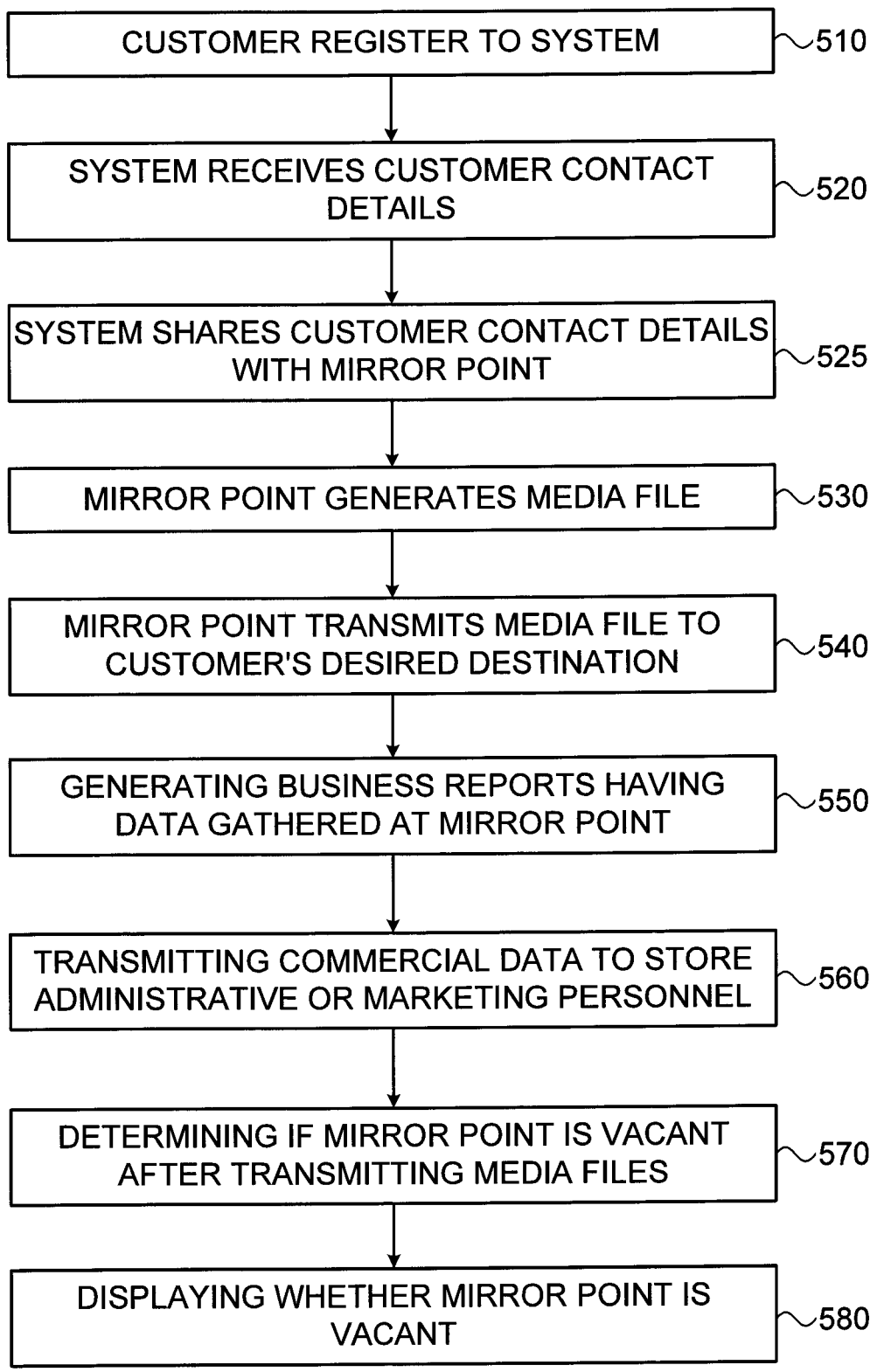

FIG. 5 shows a method of communicating with a mirror point at a clothing store, according to some exemplary embodiments of the subject matter. In step 510, the customer registers to the system 200. The customer registers to the system to be able to receive media files taken by the mirror point 110 at the clothing store, so the customer may store the media files at the customer's desired destination such as the customer's device.

In step 520, the system 200 receives the customer's contact details. The system 200 may receive the contact details from the mirror point 110, in case registration is performed at the mirror point 110, or from another computerized entity such as a registration server or a mobile application at the customer's device 106. The customer's contact details may include gender, age, email address, phone number, social network name, desired destination to which the media files are to be transmitted and the like.

In step 525, the system 200 shares the customer's contact details with the mirror point 110, in case the customer did not input the customer's contact details at the mirror point 110. In some exemplary cases, the system 200 is embedded at the mirror point 110. In some other cases, the system 200 communicates with multiple mirror points at various stores.

In step 530, the mirror point generates the media file. The media file may be a video or a still image. The capture device of the mirror point 110 generates the media file. The media file is generated at the clothing store. In some cases, the customer wears an article offered for sale at the clothing store while the media file is generated. In some exemplary cases, an ID of the article is associated with the media file. The ID of the article may be captured by the capture device such as using barcode scanning or scanned by an RFID scanner positioned in vicinity to the mirror point, or at an entrance to a room or closed space where the media file is generated.

In step 540, the mirror point transmits the generated media file to the customer's desired destination. The desired destination may be the customer's device 106, an online address, an email address, a mobile application address and the like. The mirror point may transmit a link to the media file to the customer's device and transmit the media file to another destination. The mirror point may send the media file using an SMS, MMS, WAP push, email message, a mobile application and the like. After transmitting the media file, the mirror point may delete the media file. The media file is saved at the system 200 handling data obtained from mirror points. In some exemplary embodiments, the mirror point transmits the media file to the system 200 which transmits the media file to the customer's desired destination. The system also enables the customer to view media files generated at two or more mirror points, as the system 200 is connected to and receives data from the two or more mirror points. The mirror point may establish communication with another customer after transmitting the media file or after generating the media file. The parameters of media files allocated to a customer, such as type, size and number of media files, may be predetermined and may be determined according to the customer.

In step 550, business reports are generated at the system 200. The business reports comprise data related to the customer and activities related to the customer at the store where the media files where generated or at a store where the customer communicated with a mirror point. The business reports may be associated with data received from two or more mirror points. The business report may focus on a specific customer, a group of customers, a specific retail store, a group of retail stores and the like. The business reports may comprise of: Consumer reports (registrations, store visits, demographics, points accumulation, detailed transactions), Usage reports (video clip captures and views, messages sent, social network posts and views), Product reports (barcode scans, consumer rating/reviews), Online product purchases, Coupons and promotions (coupons and promotions viewed, coupon redemptions, prizes redemption) and the like. The coupon or promotion may be determined according to parameters such as the number of media files related to the customer, number, size, type, price of an article examined by the customer. The business report may relate to feedbacks to the media file at social networks. Having the customer's contact details enable the system 200 to follow the feedbacks to the media file on social networks.

In step 560, the business report is transmitted to a store administrative or marketing personnel.

In step 570, the system 200 determines whether the mirror point is available or occupied. The system may determine an event after which the customer is no longer connected to the mirror point, such as a certain period after generating media files, via motion detection mechanism using the capture device 112 of the mirror point 110 or after a parameter associated with media files is satisfied. The parameter associated with media files may be type, size and number of media files, may be predetermined and may be determined according to the customer. For example, after 8 images or 3 video files of a total of 30 seconds, the mirror point is allocated to the next customer.

In step 580, the system indicates whether the mirror point is available or occupied. The indication may be a display at the mirror point or a message to the next customer on a queue of customers waiting to use the mirror point.

While the disclosure has been described with reference to exemplary embodiments, it will be understood by those skilled in the art that various changes may be made and equivalents may be substituted for elements thereof without departing from the scope of the subject matter. In addition, many modifications may be made to adapt a particular situation or material to the teachings without departing from the essential scope thereof. Therefore, it is intended that the disclosed subject matter not be limited to the particular embodiment disclosed as the best mode contemplated for carrying out this subject matter, but only by the claims that follow.

What is claimed is:

1. A method, comprising:
receiving contact information related to a customer communicating with a mirror point positioned at a retail store, the customer communicating with the mirror point via the customer's at least one mobile device, said mirror point comprising a mirror camera;
wherein the customer communicating with the mirror point registers the customer's at least one mobile device at the mirror point;
receiving a command at the mirror point from the customer's at least one mobile device, said command relates to operations performed by the mirror camera in the mirror point;
wherein the at least one mobile device transmits the command to the mirror point wirelessly;
manipulating the mirror camera according to the commands received from the customer's at least one mobile device;
generating a media file by the mirror camera according to the commands received wirelessly from the at least one mobile device;
wirelessly transmitting the media file from the mirror point to the at least one mobile device based on said contact information;
wherein the customer's at least one mobile device is configured to wirelessly communicate with two or more computerized mirror points, each of said two or more mirror points comprises a camera.

2. The method according to claim 1, further comprises a step of removing the media the from a display of the mirror point immediately after the media file is transmitted to a desired destination.

3. The method according to claim 1, further comprises a step of displaying whether the mirror point is occupied by a customer or is vacant.

4. The method according to claim 3, wherein displaying that the mirror point is vacant after transmitting the media file to the desired destination.

5. The method according to claim 1, wherein the customer tries on an article at the retails store when the media file is generated.

6. The method according to claim 1, further comprises storing the information related to the customer received from the two or more computerized mirror points.

7. The method according to claim 1, further comprises enabling the customer to access the information related to the customer received from the two or more computerized mirror points.

8. The method according to claim 1, wherein the contact information related to a customer includes identification information of the customer's at least one mobile device.

9. The method according to claim 1, wherein the contact information related to a customer includes information selected from the group of gender, age, email address, phone number, social network name, and desired destination to which the media file is to be transmitted.

10. The method according to claim 1, wherein manipulating the mirror camera includes an operation selected from: rotating the mirror camera, zooming-in, zooming out, capturing a picture, initiating capture of a video shot or terminating capture of a video shot.

11. The method according to claim 1, further comprising associating information related to a garment with the generated media file, wherein the information provides an identification of the garment.

12. The method of claim 1, wherein the registration of the customer's at least one mobile device at the mirror point enables the customer's at least one mobile device to receive media files from the mirror point.

13. A mirror point located at a retail store and operable by a customer, the mirror point comprises:
a customer interface for receiving commands from the customer via a customer's device;
said customer interface enabling the registration of the customer's device with the mirror point;
an image capturing device for generating media files according to the commands received wirelessly from the customer's device;
a storage structure for storing contact information related to the customer;
a transmitter for wirelessly transmitting the media files generated by the image capturing device to the customer's device, based on said contact information;
wherein the customer's device is enabled to wirelessly communicate with two or more computerized mirror points, each of said two or more mirror points comprises a camera;
a control unit for manipulating the image capturing device.

14. The system according to claim 13, wherein the storage structure further stores media files generated by the mirror point.

15. The system according to claim 13, further comprises a business interface for generating reports comprising data associated with the mirror point and user's operation of the mirror point.

16. The system according to claim 15, wherein the communication module further transmits commercial data to an entity associated with the retail stores according to the reports generated by the business interface.

17. The system according to claim 13, wherein the contact information related to a customer includes identification information of the customer's at least one mobile device.

18. The system according to claim 13, wherein the contact information related to a customer includes information selected from the group of: gender, age, email address, phone number, social network name, and desired destination to which the media file is to be transmitted.

19. The system according to claim 13, wherein the control unit allows manipulating the image capturing device, and wherein manipulating the image capturing device includes an operation selected from: rotating the image capturing device, zooming-in, zooming-out, capturing a picture, initiating capture of a video shot or terminating capture of it video shot.

20. The system of claim 13, wherein the storage structure further comprises a business information storage for storing data related to a garment associated with the media file generated, wherein the data related to the garment provides identification of the garment.

21. The system of claim 13, wherein the registration of the customer's device enables receiving media files from the mirror point by the customer's device.

* * * * *